United States Patent [19]
Campagnuolo et al.

[11] 3,712,170
[45] Jan. 23, 1973

[54] AIRCRAFT ROCKET FIRING SYSTEM

[75] Inventors: Carl J. Campagnuolo, Potomac; Clayton D. McKindra, Hyattsville; Clinton J. Sewell, Silver Spring; Fernando Villarroel, Bowie; Lionel L. Woolston, Silver Spring, all of Md.

[73] Assignee: The United States of America as represented by the Secretary of the Navy

[22] Filed: June 9, 1970

[21] Appl. No.: 44,679

[52] U.S. Cl. ............... 89/1.814, 102/70.2 G, 102/81, 244/58, 310/15
[51] Int. Cl. ..................................... F41f 3/04
[58] Field of Search ....... 89/1.814; 310/15; 102/70.2, 102/70.2 G; 244/58

[56] References Cited

UNITED STATES PATENTS

| | | | |
|---|---|---|---|
| 2,968,244 | 1/1961 | Maas, Jr. et al. | 102/49.7 X |
| 2,682,047 | 6/1954 | Allen | 102/70.2 G |
| 2,699,543 | 1/1955 | Naumann et al. | 102/70.2 G |
| 2,895,063 | 7/1959 | Morris | 102/70.2 G X |

Primary Examiner—Samuel W. Engle
Attorney—R. S. Sciascia, J. A. Cooke and R. J. Erickson

[57] ABSTRACT

A system for firing aircraft rockets including a fluidic generator exposed to the airstream passing the launching aircraft in flight for generating the electrical power necessary to operate the firing circuit. The fluidic generator produces a voltage output when a predetermined minimum air speed is achieved to charge capacitors in the firing circuit. Silicon controlled rectifiers are shunted across the capacitors to immediately discharge them when the aircraft decelerates below the predetermined minimum air speed.

3 Claims, 3 Drawing Figures

Carl J. Campagnuolo
Clayton D. McKindra
Clinton J. Sewell
Fernando Villarroel
Lionel L. Woolston
INVENTORS 3,712,170

AIRCRAFT ROCKET FIRING SYSTEM

BACKGROUND OF THE INVENTION

The invention relates generally to aerial rocket launching systems and particularly to a velocity discriminating electrical system for firing rockets from aircraft.

Conventional airborne rocket firing systems have been devised which include an intervalometer located in the rocket launching pod coupled between the aircraft's electrical power supply and the electrical igniter squibs in the rocket motor, such as disclosed in U.S. Pat. No. 3,396,628. In these prior art systems, a firing command signal from the aircraft drives the intervalometer motor which mechanically closes the intervalometer's rotary firing switches in sequence, thereby sequentially connecting each of the rocket motor igniters to the power supply of the aircraft to thus fire the rockets. The firing circuit usually includes a manually operated safety switch located on the launching pod externally of the aircraft which is normally opened to isolate the rocket motors from the aircraft's power supply and is manually closed by the flight crew prior to take-off. Since the safety switch must be manually opened after an aircraft lands with some or all of its rockets still in the launching pod, the power supply remains coupled to the intervalometer during landing of the aircraft until such time as the safety switch is manually opened, which operation may be inadvertently omitted leaving the power supply available to the rocket motors. To minimize the possibility of accidental rocket firings a second safety switch is sometimes incorporated in the firing circuit which automatically opens when the aircraft landing gear is lowered and automatically closes when the landing gear is raised. Although these safety switches usually operate satisfactorily, there have been occasional accidental rocket firings which would not have occurred if the safety switches had functioned properly. Those incidents have clearly indicated an urgent requirement for a rocket launching system having greater safety characteristics than previous systems.

SUMMARY OF THE INVENTION

It is therefore an object of the present invention to provide a rocket firing system having improved safeguards against accidental firing of the rocket.

Another object of this invention is to provide an electrical rocket firing system having improved safety features which automatically provide air speed discrimination and are independent of the human element for successful operation.

A further object of this invention is to provide a new and improved air-driven electrical power supply having air speed discriminating capabilities.

Yet another object of the instant invention is the provision of an improved firing circuit for rocket launchers for use with a low voltage power supply.

Still another object of this invention is to provide a rocket firing system having an improved firing circuit operable with an air-driven electrical power supply.

Briefly, in accordance with one embodiment of this invention, these and other objects are attained by providing a rocket firing system in which a fluidic generator is positioned in the airstream passing the aircraft which functions as the power supply for charging an electrical energy storage device in the firing circuit. The fluidic generator discriminates between the safe and unsafe launching speeds of the aircraft by producing a voltage output only while the aircraft is flying at speeds in excess of a predetermined minimum safe air speed. The firing circuit also includes circuitry for rapidly discharging the energy storage device when the fluidic generator output is terminated upon deceleration of the aircraft below the predetermined minimum safe air speed.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
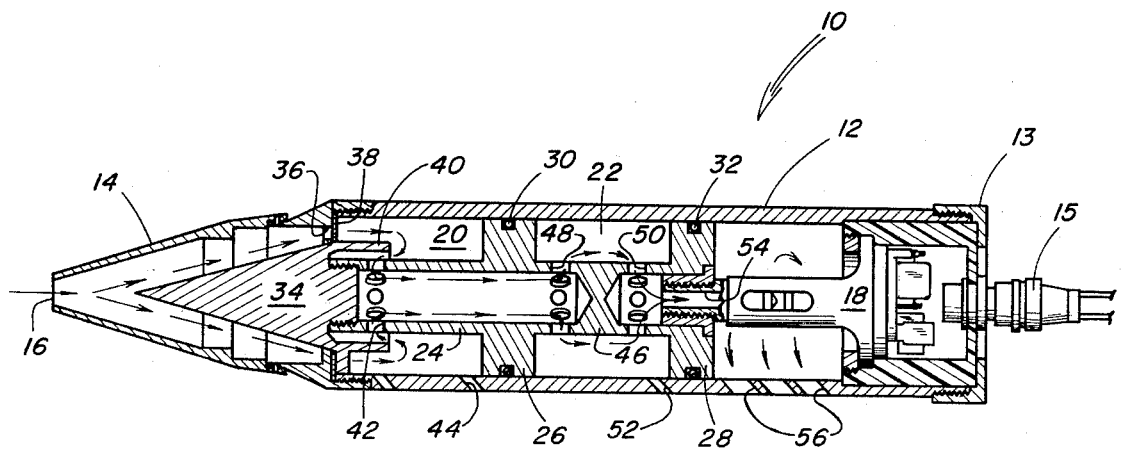
FIG. 1 is a side elevation, partially in section, of the velocity discriminating air-driven electrical power source of the rocket firing system.

Referring now to the drawings wherein like reference characters designate identical or corresponding parts throughout the several views, and more particularly to FIG. 1 thereof, an environmentally actuated power supply 10 is shown which is adapted to be mounted externally on an aircraft in the airstream passing the aircraft. The power supply unit includes an elongated cylindrical housing 12 having a hollow frusto-conical nose fairing 14 defining a fluid inlet 16 at the upstream end thereof. A fluidic generator 18 is mounted in the downstream end of the cylindrical housing 12 and includes a transducer driven by the airstream to produce a voltage output, as will be hereinafter described in detail with reference to FIG. 2. The downstream end of the cylindrical housing 12 of the power supply unit is closed by a threaded cap 13 having an electrical connector 15 mounted thereon and extending through a central aperture in cap 13 for connection to the fluidic generator 18. To assure the proper and reliable operation of the fluidic generator, the air-driven power supply unit is provided with first and second air cleaning chambers 20 and 22, respectively, forwardly of the fluidic generator for the purpose of separating any water or other debris from the airstream prior to reaching the fluidic generator.

Positioned concentrically within the housing 12 is a tubular conduit 24 having first and second spaced apart radial flanges 26 and 28 which may be provided with O-rings 30 and 32 for sealing engagement with the inner surface of the housing 12 to define the downstream partition walls of the first and second air cleaning chambers 20 and 22, respectively. Threadedly mounted upon the upstream end of the tubular conduit 24 is a conically tapered nose plug 34 which is positioned within the nose fairing 14 and cooperates therewith to define an annular fluid inlet 36. A filter 38, such as an annular perforated screen, is positioned transversely across the annular inlet 36 to separate any solid particles entrained in the airstream from the air flowing into the power supply unit. The nose plug 34 has a rearwardly extending annular shroud 40 which is of such diameter as to be concentrically positioned between and radially spaced from both the cylindrical housing 12 and the tubular conduit 24 and is of such length as to circumscribe a portion of the length of the tubular conduit 24. A plurality of through radial apertures 42 are formed in the upstream end of tubular conduit 24 at a position within the shroud 40.

Air entering the annular nozzle 36 is obstructed by the flange 26 and is forced to reverse its direction by 180° to flow forwardly into the through apertures 42 and again reverse its direction 180° to flow rearwardly through the tubular conduit 24 toward the second air cleaning chamber. By directing the airstream through this tortuous path, any water entrained in the airstream is separated from the air by the inertial forces on the water, collected within the first air cleaning chamber 20 and drained off into the atmosphere through one or more drain ports 44 formed in the cylindrical housing 12 upstream of the flange 26.

After most of the water has been separated from the airstream in the first cleaning section, the air flows rearwardly through conduit 24 which has a transverse closure plug 46 formed therein at a position intermediate of flanges 26 and 28. The conduit is further provided with two sets of through radial apertures 48 and 50 formed on opposed sides of the closure plug 46 and positioned between the flanges 26 and 28. The airstream in conduit 24 flows from the first cleaning chamber 20 through apertures 48 into the second cleaning chamber 22 and then flows back into the conduit 24 through apertures 50. This deflection of the airstream serves to further separate out any remaining water particles from the airstream. The separated water is permitted to collect in the annular space between conduit 24 and housing 12 and then is drained off into the atmosphere through one or more drain ports 52 formed in that portion of the housing 12 surrounding the second cleaning chamber. The cleaned air then flows rearwardly into an elongated inlet tube 54 of the fluidic generator and the exhaust air from the fluidic generator is vented into the atmosphere through a plurality of exhaust ports 56 formed in the housing 12.

Figure 2:
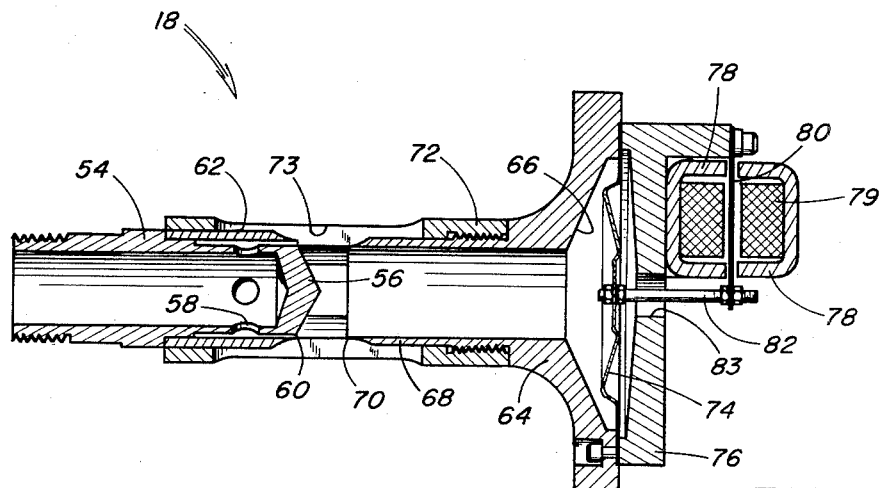
FIG. 2 is an enlarged sectional view of the fluidic generator of the electrical power supply.

Referring now to FIG. 2, an enlarged view of the fluidic generator 18 more clearly illustrates the structure of a preferred embodiment thereof. The elongated inlet tube 54 is closed at its downstream end by a transverse wall 56 which causes the airstream to be diverted radially outwardly through a plurality of apertures 58 formed in the wall of inlet tube 54 and thus flow into an annular nozzle 60 defined by a cylindrical nozzle shroud 62 which circumscribes the downstream portion of the inlet tube 54. The fluidic generator further includes a housing 64 which forms a frusto-conical cavity 66 having an elongated cylindrical cavity inlet 68 which, in the preferred embodiment, has its upstream edge formed into a knife edge 70. The annular nozzle 60 is maintained in coaxial alignment with the entrance to the cavity 66 by means of a cylindrical sleeve 72 which has longitudinal slots 73 formed therein to provide an exhaust path for the airstream. The divergent end of the frusto-conical cavity 66 is sealingly closed by a circular metal diaphragm 74 which is clamped to the generator housing 64 by a support block 76. Mounted upon the support block is a pair of opposed permanent magnets 78 having a coil 79 positioned therebetween. A flexible ferromagnetic reed 80 is rigidly secured at one end to the support block and is centered between the magnetic poles so that no magnetic polarity is induced in the reed. The other end of the reed 80 is connected to the center of the metal diaphragm 74 by a shaft 82 which extends through an aperture 83 centrally formed in the support block.

When the airflow through the annular nozzle 60 reaches a predetermined velocity, the air column in the cavity will resonate and the air will oscillate in and out of the cavity 66 as it is alternately compressed and expanded by the influx and efflux of the air. The pulsating effect of the resonating air column acts upon the diaphragm 74 to cause the diaphragm to vibrate at its resonant frequency. Thus vibration is transmitted to the reed 80 by the shaft 82 causing the reed to deflect from its normally centered position and to oscillate back and forth between the magnetic poles thereby to induce alternating magnetic polarities in the reed which induces an a.c. voltage in the coil 79. The frequency of the induced a.c. voltage is determined by the resonant frequency of the diaphragm 74 and is independent of the velocity of the airstream, while the amplitude of the voltage is proportional to the amplitude of vibration of the diaphragm which is proportional to the velocity of the air stream. Fluidic generator 18 may be tuned or calibrated to commence resonating at nearly any predetermined air speed by selectively varying the width of the annular nozzle 60, the diameter of the cavity inlet 68, and the axial distance between knife edge 70 from the annular nozzle 60. To make the fluidic generator insensitive to temperature changes and to closely match the resonant frequency of the diaphragm with that of the air column in the cavity, the diaphragm is preferably made from a metal having a coefficient of thermal expansion substantially equal to zero, such as for example, the alloy Nispan containing principally nickel, chrominum, carbon, magnesium, silicon and titanium.

Figure 3:
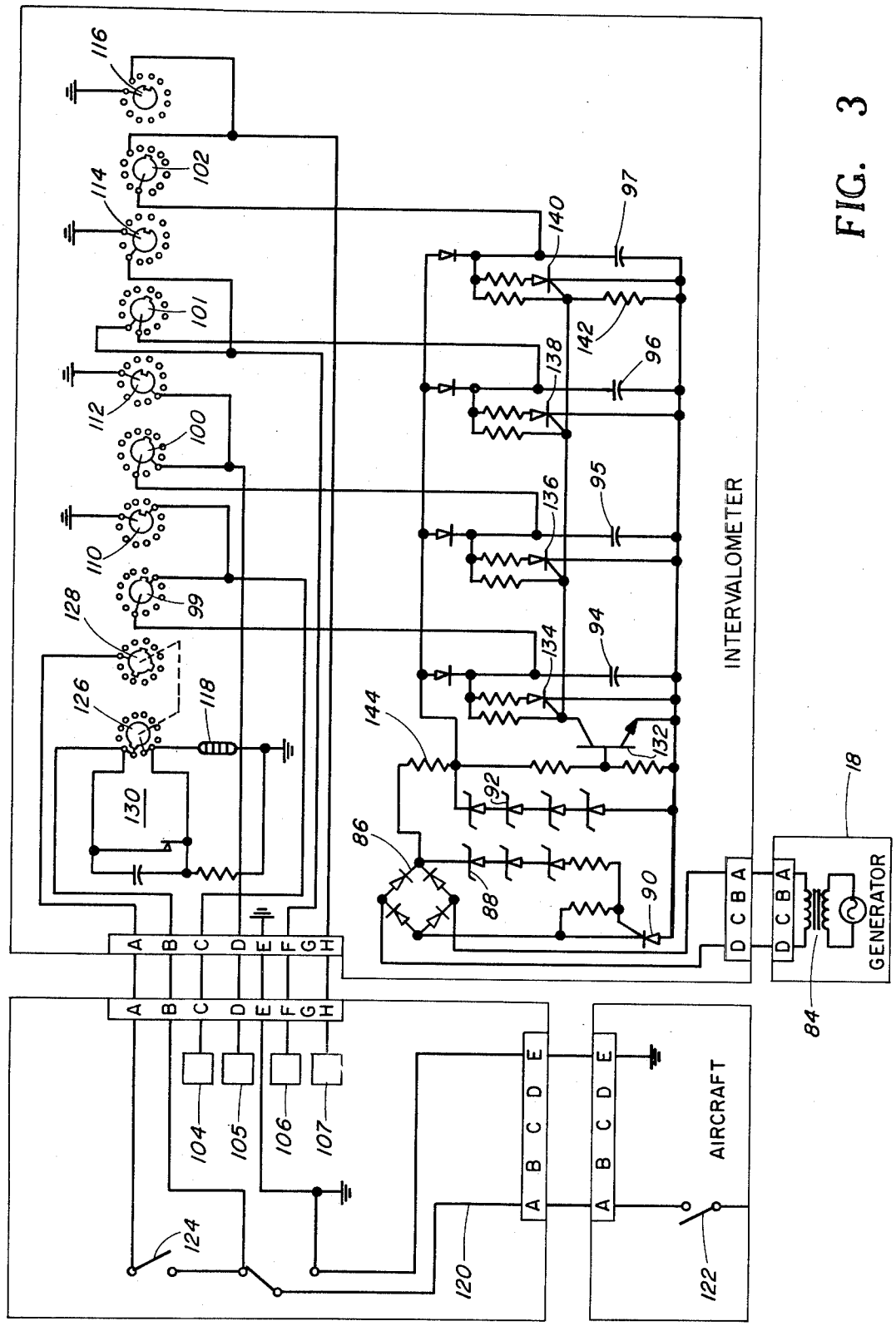
FIG. 3 is a schematic diagram of the firing circuit of the instant invention.

The function of fluidic generator 18 in the rocket firing system of this invention will be more apparent from FIG. 3 wherein the output of the generator 18 is shown as being directed through a step-up voltage transformer 84 and is then applied to a full-wave bridge rectifier 86. Although the fluidic generator is tuned or calibrated to resonate and produce an output when subjected to a predetermined air speed, the voltage output of the generator rises gradually. To provide the firing circuit with a constant level voltage having a short rise time, a first set of series connected zener diodes 88 and a silicon controlled rectifier 90 are coupled across the output of rectifier bridge 86 to establish a sharp threshold level above which the voltage rises rapidly to the desired level. A second set of zener diodes 92 is also coupled across the output of the rectifier for limiting the voltage to a value below the breakdown voltage of a plurality of parallel connected firing capacitors 94, 95, 96 97.

The capacitors, which store the generator output and build up an accumulated charge of sufficient magnitude to actuate a rocket motor igniter squib, are each coupled, respectively, to the sliding contact on a plurality of rotary switches 99, 100, 101 and 102. Each of a plurality of rocket motor igniter squibs 104, 105, 106 and 107 is normally coupled to electrical ground through a second set of rotary switches 110, 112, 114 and 116, respectively. The igniter squibs 104–107 are additionally coupled to a respective stationary contact of the rotary switches 99–102. The rotary switches are actuated by a solenoid 118 in response to a firing command signal on line 120 when a firing switch 122 in the aircraft is closed by the pilot. A second switch 124 in the line 120 controls the operation of solenoid 118 through rotary switches 126 and 128 and an interrupter 130 to provide either a single-fire mode or a ripple-fire mode, in which the squibs are rapidly ignited in sequence as switch 122 is held in a closed position. The operation of a typical single fire-ripple fire solenoid control means is more fully described in U.S. Pat. No. 3,396,628.

In operation when the aircraft is not airborne, generator 18 provides no voltage output and thus there is no charging voltage applied to capacitors 94 through 97 and no electrical power is available to fire the rockets. For this reason, even though the rotary switches may be accidentally actuated to a closed position, accidental rocket firing will not occur because of the absence of any charge on the firing capacitors. After the aircraft has taken off and reached the predetermined minimum safe speed, the fluidic generator begins to resonate and thereby provides an a.c. voltage output which is stepped-up by transformer 84 and converted to a d.c. charging voltage by rectifier 86 and causes a transistor 132 to switch on, thus permitting the charging voltage to be applied across capacitors 94, 95, 96 and 97 continuously during flight of the aircraft. At any time during flight, a firing command signal from the aircraft pilot on line 120 to the solenoid 118 will rotate the rotary switches of the intervalometer and thus connect the charged firing capacitors to the respective rocket motor igniters to launch the rockets. In the event that the pilot does not fire any or all the rockets during flight and returns to the base or ship carrying unfired rockets, the generator 18 will cease to produce any output as soon as the plane decelerates below the minimum air speed necessary for resonance of the fluidic generator. When this occurs, the transistor 132 is automatically switched off and each of the firing capacitors 94, 95, 96 and 97 is bled-off to electrical ground across silicon controlled rectifiers 134, 136, 138 and 140, respectively, and bleed down resistor 142. The bleed-down time for the capacitors is as little as a few seconds and therefore the firing capacitors will be fully discharged prior to or shortly after touch down of the aircraft. Among the other components of the firing circuit, a resistor 144 is coupled in series between the rectifier 86 and the capacitors to match the impedance of the capacitor circuits with the transformer 84. Additionally, the silicon controlled rectifiers 134, 136, 138 and 140 have current limiting resistors connected in series with the anodes of the SCRs and biasing resistors coupled between the anodes and the cathode gate of each SCR.

With the firing system of this invention, it will be appreciated that electrical power for firing the rockets is only available during actual flight of the aircraft at speeds in excess of the predetermined minimum safe flying speed. Additionally, by utilizing the air-driven fluidic generator 18 as the power supply for the firing of the rockets, the safety factor of the weapon system has been increased substantially over previously known systems wherein the power supply for firing of the rockets was derived from the aircraft's power supply and manually actuated switches were relied upon to disconnect the intervalometer from the aircraft power supply. With the enviromentally actuated system of this invention, an automatically actuated safety device is incorporated into the system which functions independently of human intervention to isolate the rocket motor igniters from any rocket-firing power supply when the aircraft is not airborne.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An electrical system for firing rockets from an aircraft comprising:
    a velocity discriminating air-driven transducer means responsive to air flow velocities greater than a predetermined minimum velocity for producing an a.c. voltage output;
    a firing circuit including
    rectifier means coupled to the output of said transducer means for converting an a.c. input to d.c. output;
    capacitor means coupled to said rectifier means for storing electrical energy;
    voltage limiting means coupling the output of said rectifier means to each of said capacitor means;
    shunting means including silicon controlled rectifiers coupled across each capacitor means for discharging said capacitor means upon termination of an output from said transducer means; and
    switch means for coupling each capacitor means to the rocket motor.

2. The system of claim 1 wherein said source of electrical energy includes
    means defining a cavity having one end open to an ambient airstream,
    a resilient diaphragm positioned within said cavity for vibrational movement in response to resonance of the airstream in said cavity,
    said transducer being coupled to said diaphragm for generating said a.c. output in response to said diaphragm movement.

3. The system of claim 2 wherein said means defining a cavity includes
    means defining a frusto-conical cavity having the convergent end of said conical cavity in fluid communication with a cylindrical cavity extension,
    said diaphragm being sealingly attached to the divergent end of said conical cavity and forming an end closure therefor.

* * * * *